United States Patent
Leigh et al.

(10) Patent No.: US 10,367,284 B2
(45) Date of Patent: Jul. 30, 2019

(54) SOCKET TO SUPPORT BOARDS IN A SPACED RELATION

(71) Applicant: HEWLETT PACKARD ENTERPRISE DEVELOPMENT LP, Houston, TX (US)

(72) Inventors: Kevin B Leigh, Houston, TX (US); George D Megason, Spring, TX (US); John Norton, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/747,756

(22) PCT Filed: Jul. 27, 2015

(86) PCT No.: PCT/US2015/042315
§ 371 (c)(1),
(2) Date: Jan. 25, 2018

(87) PCT Pub. No.: WO2017/019025
PCT Pub. Date: Feb. 2, 2017

(65) Prior Publication Data
US 2018/0226735 A1    Aug. 9, 2018

(51) Int. Cl.
*H01R 12/73* (2011.01)
*G02B 6/42* (2006.01)
(Continued)

(52) U.S. Cl.
CPC ............. *H01R 12/73* (2013.01); *G02B 6/428* (2013.01); *G02B 6/4269* (2013.01);
(Continued)

(58) Field of Classification Search
CPC ...... H01R 12/73; H01R 12/79; G02B 6/4269; G02B 6/428
(Continued)

(56) References Cited

U.S. PATENT DOCUMENTS 5,430,611 A   7/1995 Patel et al.
6,132,104 A  10/2000 Bliss
(Continued)

FOREIGN PATENT DOCUMENTS

JP    2003297989   10/2003
WO   WO-2013165356  11/2013

OTHER PUBLICATIONS

Labounty, C.J. et al., Integrated Cooling for Optoelectronic Devices, (Research Paper), Apr. 19, 2000, 7 Pages.
(Continued)

*Primary Examiner* — Mukundbhai G Patel
(74) *Attorney, Agent, or Firm* — Hewlett Packard Enterprise Patent Department

(57) ABSTRACT

According to an example, a socket to support a first board in a spaced relation to a second board may include a base section having openings to receive connectors that are to electrically connect the first board to the second board. The socket may also include a plurality of walls extending from the base section, in which each of the plurality of walls is angled with respect to the base section and in which the plurality of walls include air ducts to enable air to flow through the socket when the first board is positioned on the socket. The socket may further include socket alignment elements extending from the base section, in which the alignment elements are to be inserted into mating holes in the second board.

20 Claims, 5 Drawing Sheets

(51) Int. Cl.
*H01R 12/70* (2011.01)
*H01R 13/00* (2006.01)
*H01R 43/26* (2006.01)
*G02B 6/43* (2006.01)

(52) U.S. Cl.
CPC ....... *H01R 12/7005* (2013.01); *H01R 13/005* (2013.01); *H01R 43/26* (2013.01); *G02B 6/43* (2013.01)

(58) Field of Classification Search
USPC .......................................................... 361/688
See application file for complete search history.

(56) References Cited

U.S. PATENT DOCUMENTS

| | | | |
|---|---|---|---|
| 6,252,726 B1 | 6/2001 | Verdiell | |
| 6,270,262 B1 | 8/2001 | Hudgins et al. | |
| 6,353,329 B1 | 3/2002 | Kiffe | |
| 6,512,861 B2 | 1/2003 | Chakravorty et al. | |
| 6,768,642 B2 | 7/2004 | Hines | |
| 7,470,069 B1* | 12/2008 | Offrein | G02B 6/43 257/184 |
| 7,539,026 B2 | 5/2009 | Finnerty | |
| 7,736,183 B2* | 6/2010 | Trout | H01R 13/6471 439/607.1 |
| 8,290,008 B2 | 10/2012 | Andry | |
| 8,425,246 B1 | 4/2013 | Heng | |
| 8,470,682 B2 | 6/2013 | Anderson | |
| 8,905,632 B2 | 12/2014 | Shastri et al. | |
| 9,054,812 B2 | 6/2015 | Yagisawa et al. | |
| 9,543,226 B1 | 1/2017 | Nuttall | |
| 2006/0078248 A1* | 4/2006 | Sasaki | G02B 6/4214 385/14 |
| 2009/0075499 A1 | 3/2009 | Szu | |
| 2010/0072587 A1 | 3/2010 | Naito | |
| 2010/0103605 A1 | 4/2010 | Jafari | |
| 2012/0058670 A1* | 3/2012 | Regnier | H01R 13/65802 439/485 |
| 2012/0267797 A1 | 10/2012 | Haba et al. | |
| 2012/0326290 A1 | 12/2012 | Andry | |
| 2013/0082372 A1 | 4/2013 | Lin | |
| 2013/0230272 A1 | 9/2013 | Raj et al. | |
| 2013/0279115 A1 | 10/2013 | Blumenthal | |
| 2014/0063743 A1 | 3/2014 | Chan et al. | |
| 2014/0253728 A1 | 9/2014 | Glockler | |
| 2014/0266416 A1 | 9/2014 | Dally | |
| 2014/0327126 A1 | 11/2014 | Narasimhan | |
| 2017/0148703 A1 | 5/2017 | Miura et al. | |

OTHER PUBLICATIONS

PCT/ISA/KR, International Search Report and Written Opinion, dated Apr. 25, 2016, PCT/US2015/042315, 9 pages.
European Search Report and Search Opinion Received for EP Application No. 15900526.3, dated Oct. 5, 2018, 13 pages.
International Preliminary Report on Patentability received for PCT Patent Application No. PCT/US2015/043189, dated Feb. 15, 2018, 10 pages.
PCT International Search Report issued in Application No. PCT/US2015/043189; dated Apr. 28, 2016; 3pages.
Schletz, A.; "Packaging for Electronics," May 9, 2014, 2 pps.

* cited by examiner

_US 10,367,284 B2_

SOCKET TO SUPPORT BOARDS IN A SPACED RELATION

BACKGROUND

There has been a significant increase in the integration of optical transceivers and connectors with other electronic components in a single package. As the operations of the optical transceivers and the other electronic components are sensitive to heat, temperature control techniques involving dissipation of heat from the electronic components of the opto-electronic assemblies are typically implemented. One of these temperature control techniques includes the use of heat sinks.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Additionally, It should be understood that the elements depicted in the accompanying figures may include additional components and that some of the components described in those figures may be removed and/or modified without departing from scopes of the elements disclosed herein. It should also be understood that the elements depicted in the figures may not be drawn to scale and thus, the elements may have different sizes and/or configurations other than as shown in the figures. The elements may include the sockets, the first boards, the second boards, etc., depicted in the figures.

Disclosed herein are a socket to support a first board in spaced relation to a second board, an opto-electronic assembly containing the socket, and a method for assembling the opto-electronic assembly. The socket disclosed herein may include a plurality of walls having air ducts formed therein to enable air to flow through an interior of the socket. The socket also includes features to enable electrical and optical components of the first board, which may be a mezzanine board, to mate with electrical and optical components contained in the interior of the socket. That is, the socket may enable the optical components of the first board to be positioned on a side of the first board that is opposite to the side on which a processor chip is provided.

Through implementation of the socket disclosed herein an opto-electronic assembly may be formed in which the optical components of a first board may be positioned in a lower temperature airflow as compared with the airflow in which a processor chip on the first board is positioned. As the optical components may be sensitive to heat, maintaining the optical components in the lower temperature airflow may extend the useful lives of the optical components. In addition, the airflow volume around the processor chip may be increased because the optical components may not operate as obstructions to the airflow around the processor chip. As greater heat removal may be obtained, the socket disclosed herein may enable relatively high power, and thus, high heat generating processor chips to be employed in an opto-electronic assembly.

Figure 1:
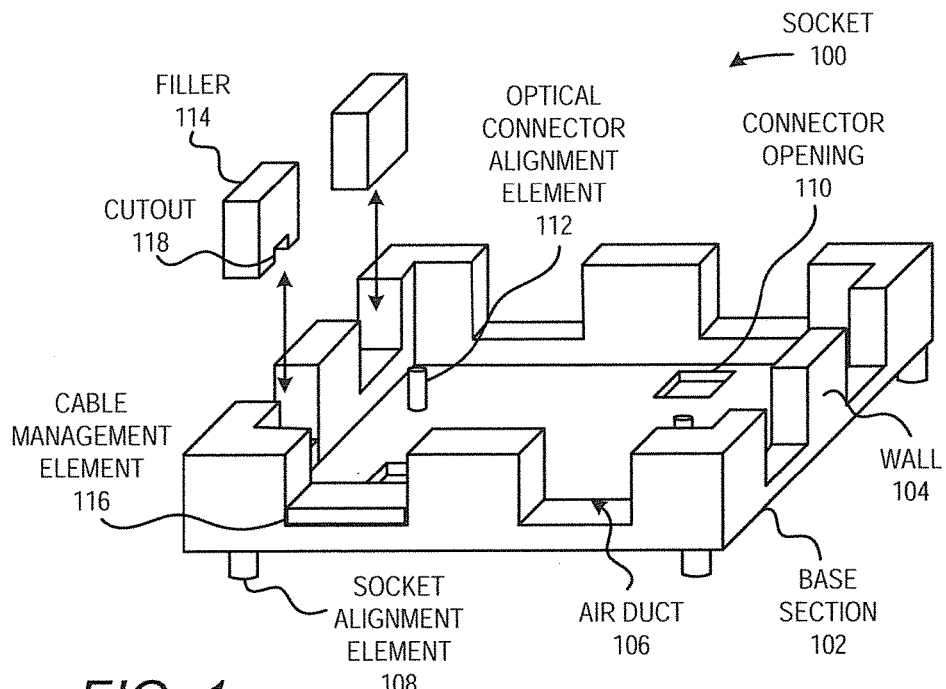
FIG. 1 is a simplified isometric view of a socket to support a first board in spaced relation to a second board, according to an example of the present disclosure.

With reference first to FIG. 1, there is shown a simplified isometric view of a socket 100 to support a first board in spaced relation to a second board, according to an example of the present disclosure. As shown, the socket 100 may include a base section 102 and a plurality of walls 104 extending from the base section 102. Each of the plurality of walls 104 is depicted as being angled with respect to the base section 104, e.g., positioned at approximately 90 degrees with respect to the base station 104. Each of the walls 104 is also depicted as including air ducts 106 through which air is to flow into and out of the interior of the socket. The air ducts 106 may be formed as cutouts in the walls 104 and thus, the walls 104 may be considered as being castellated.

Although not explicitly shown, the tops of the walls 104 may include physical features to enable a first board, which is also referenced herein as a mezzanine board, to be blindly mated with the socket 100. The physical features may include, for instance, chamfering at the tops of the walls 104, keying posts that are to mate with openings or cutouts in the first board, etc. In any regard, the physical features may enable the first board to be guided into position on top of the socket 100 to enable various electrical and optical connections to automatically be made as the first board is placed into position on top of the socket 100.

The socket 100 is also depicted as including socket alignment elements 108 positioned on a bottom surface of the base section 102. As discussed in greater detail herein below, the socket alignment elements 108 may be inserted into mating holes in the second board, which may be a system board, a motherboard, or the like. The socket alignment elements 108 may enable the socket 100 to be blindly mated with the second board while automatically aligning electrical and other connectors between the first board and the second board. The socket alignment elements 108 may also protect the electrical and other connectors during placement of the socket 100 onto the second board.

The socket 100 is further depicted as including connector openings 110 through which electrical connectors (not shown) extending from the second board are to extend such that the electrical connectors mate with mating electrical connectors extending from a bottom of the first board. The socket 100 is still further depicted as including optical connector alignment elements 112 that are to mate with an optical connector of an optical transceiver as discussed in greater detail herein below.

The socket 100 is still further depicted as including fillers 114 and a cable management element 116. The fillers 114 and the cable management element 116 may be inserted into desired ones of the air ducts 106 through, for instance, rails (not shown) provided in the air ducts 106 or on the fillers 114 and the cable management element 116. In one regard, the fillers 114 may be positioned in selected ones of the air ducts 106 to substantially block air from flowing through those air ducts 106 and thus enable control of airflow through the socket 100. The fillers 114 or other similar airflow diverting elements may also be positioned within the interior of the socket 100 to control, e.g., divert, airflow within the socket 100. In addition, the fillers 114 may include cutouts 118 that are sized to enable optical fibers or other cables to extend into and out of the interior of the socket 100. The cutouts 118 may be relatively small such that air flow through the fillers 114 may be minimized. The cable management element 116 may include features that are to maintain cables at desired locations within the air ducts 106 and thus minimize blockage of airflow through the air ducts 106.

Figure 2:
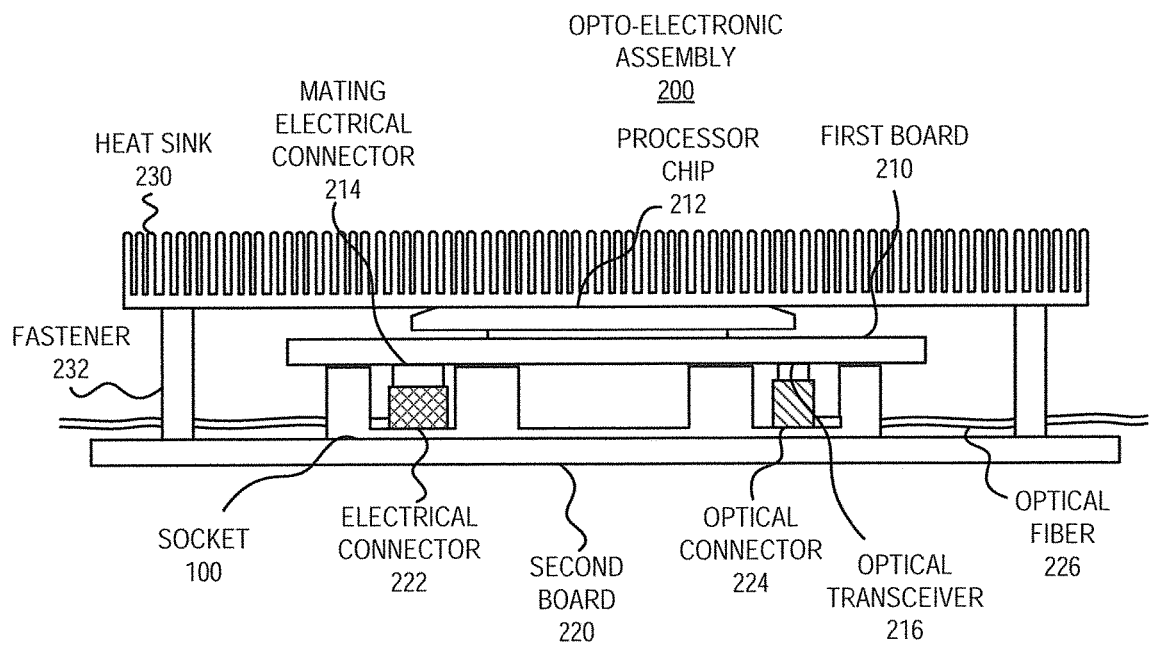
FIG. 2 is a simplified side view of the opto-electronic assembly containing the socket depicted in FIG. 1 in a position to support a first board in a spaced relation to a second board, according to an example of the present disclosure.

Turning now to FIG. 2, there is shown a simplified side view of an opto-electronic assembly 200 containing the socket 100 depicted in FIG. 1 in a position to support a first board 210 in a spaced relation to a second board 220, according to an example. As shown in FIG. 2, the socket 100 may be positioned between the first board 210, which may be a mezzanine board, and a second board 220, which may be a system board, a motherboard, or the like. As also shown, a processor chip 212, which may be a CPU, a network switch application specific integrated circuit (ASIC), or the like, may be provided on a first side of the first board 210. In addition, a mating electrical connector 214 and an optical transceiver 216 may be provided on a second, opposite, side of the first board 210. The processor chip 212 may be thermally coupled with a heat sink 230, which may be attached to the second board 220 through fasteners 232. In one example, the heat sink 230 may be a finned type as shown in FIG. 2. In another example, the heat sink 230 may be a liquid-cooled type (not shown). The processor chip 212 may generate relatively large amounts of heat during operation and most of the generated heat may be dissipated through the heat sink 230. As such, for instance, the temperature of the airflow above the first board 210 may be significantly higher than the temperature of the airflow below the first board 210 when the processor chip 212 is active.

The positioning of the socket 100 between the first board 210 and the second board 220 enables the optical transceiver 216 to be positioned below the first board 210, i.e., in the lower temperature airflow area of the opto-electronic assembly 200. In one regard, because the performance and wearout reliability of the optical transceiver 216 may be adversely be affected by the relatively high temperatures generated by the processor chip 212, positioning the optical transceiver 216 in the lower temperature airflow area may improve the performance and useful lifetime of the optical transceiver 216 as compared with placing the optical transceiver 216 in the higher temperature airflow area above the first board 210.

As also shown in FIG. 2, an electrical connector 222 positioned on the second board 210 may extend through a connector opening 110 and mate with the mating electrical connector 214. Thus, the components on the first board 210, including the processor chip 212, may receive power from the second board 220 through the mating electrical connector 214. Additionally, an optical connector 224 may be positioned in the socket 100 and may mate with the optical transceiver 216. The optical connector 224 may be positioned on the optical connector alignment element 112.

The components on the first board 210, including the processor chip 212, may send and receive data through the optical transceiver 216 via the optical connector 224. An optical fiber 226 connected to the optical connector 224 may extend through one of the air ducts 106 in the socket wall 104. In instances in which a filler 114 has been positioned in the air duct 106, the optical fiber 226 may extend through a cutout 118 in the filler 114. In an example, the filler 114 may include a feature (not shown) to cause the optical fiber 226 to be directed toward the second board 220 as the optical fiber 226 exits the cutout 118. In other examples, a cutout may be provided in the base section 102 through which the optical fiber 226 may extend.

Through placement of the optical transceiver 216, and thus, the optical connector 224 and the optical fiber 226, below the surface of the first board 210 on which the processor chip 212 is positioned, there may be less obstructions on that surface to block airflow. As such, for instance, heat generated by the processor chip 212 may be dissipated into ambient airflow relatively more efficiently than when there are a greater number of obstructions. Additionally, the air ducts 106 provided in the socket 100 enable air to flow through the socket 100 to thus cool the components and the airflow contained in the interior of the socket 100.

According to an example, the socket 100 may be formed of a plastic or other suitable material and may be sized to enable sufficient space to be formed for the mating electrical connector 214, the optical transceiver 216, the electrical connector 222, and the optical connector 224 to be positioned within the interior of the socket 100. In instances in which the distances between some of the components on the first board 210 that are to mate with other components on the second board 220, do not match, spacers or risers may be used to enable the components to correctly mate with each other.

Figure 3:
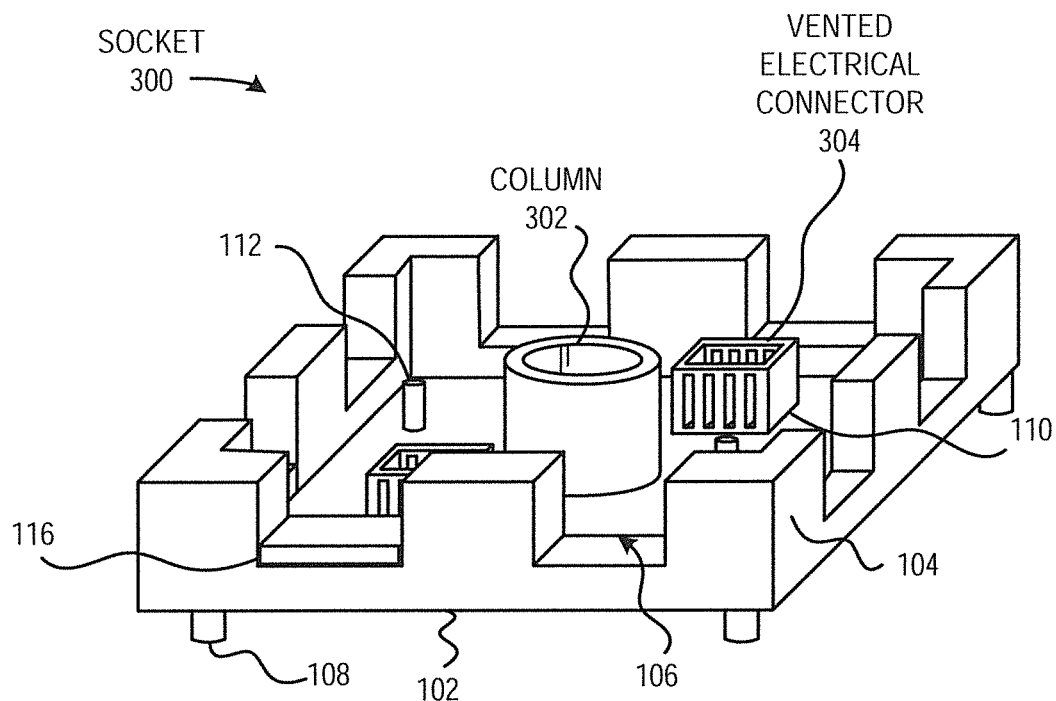
FIG. 3 shows simplified isometric view of a socket, according to an example of the present disclosure.

With reference now to FIG. 3, there is shown a simplified isometric view of a socket 300, according to another example of the present disclosure. The socket 300 depicted in FIG. 3 includes many of the same elements as those included in the socket 100 depicted in FIG. 1. As such, the features in the socket 300 that are common to the features in the socket 100 will not be described in detail other than to provide a description of how those features operate in the context of the socket 300. Instead, the descriptions of the common features provided above with respect to the socket 100 are intended to also describe the common features contained in the socket 300.

Initially, the socket 300 depicted in FIG. 3 differs from the socket 100 depicted in in FIG, 1 in that the socket 300 includes a column 302 extending from a central location of the base section 102. The column 302 may be shaped and sized such that a top of the column 302 contacts a bottom surface of the first board 210. In this regard, the column 302 may support part of the weight of the first board 210, especially when the fasteners 232 are tightened to compress and secure the heat sink 230 on top of the processor chip 212 (FIG. 2).

Secondly, a vented electrical connector 304 is depicted as extending through the connector opening 110. In this regard, air may flow through openings in the vented electrical connector 304 to thus cool the power-delivering contacts of the vented electrical connector 304 in the socket 300.

Figure 4A:
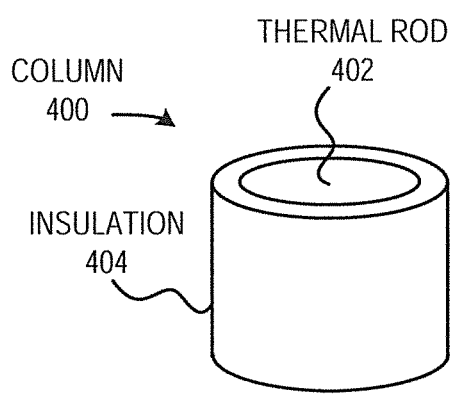
FIGS. 4A and 4B, respectively show isometric views of a column, which may be equivalent to the column depicted in FIG. 3, according to two examples of the present disclosure.
Figure 4B:
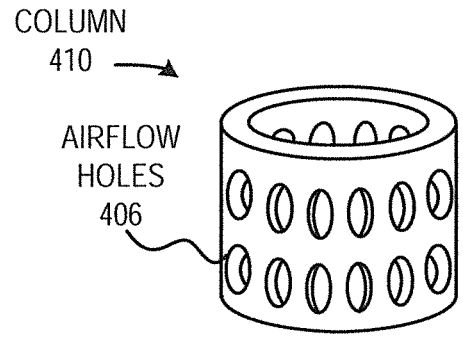

Turning now to FIGS. 4A and 4B, there are respectively shown isometric views of columns 400, 410, which may be equivalent to the column 302 depicted in FIG. 3, according to two examples. In FIG. 4A, the column 400 is depicted as including a thermal rod 402 and an insulation 404 wrapped around the thermal rod. An opposite end of the thermal rod 402 may extend through the second board 220 to a heat sink or other heat dissipating device (not shown) positioned beneath the second board 220. In one regard, the thermal rod 402 may be positioned directly beneath the processor chip 212 (FIG. 2) such that heat that is dissipated from the processor chip 212 and through the first board 210 may be conducted away from the first board 210 and through the thermal rod 402. Additionally, the insulation 404 may substantially prevent or limit the conduction of heat from the thermal rod 402 to the airflow outside of the column 400.

In FIG. 4B, the column 410 may include airflow holes 406. In this example, the second board 220 may include an opening that is aligned with the center opening in the column 410 such that air may flow through the airflow holes 404 and through the opening in the second board 220. As such, air may flow into the interior of the socket 300 through some of the air ducts 106 and may flow out of the socket 300 through either or both of other air ducts 106 and the column 410. Alternatively, air may flow into the interior of the socket 300 through the column 410 and may flow out of the socket 300 through the air ducts 106.

Figure 5:
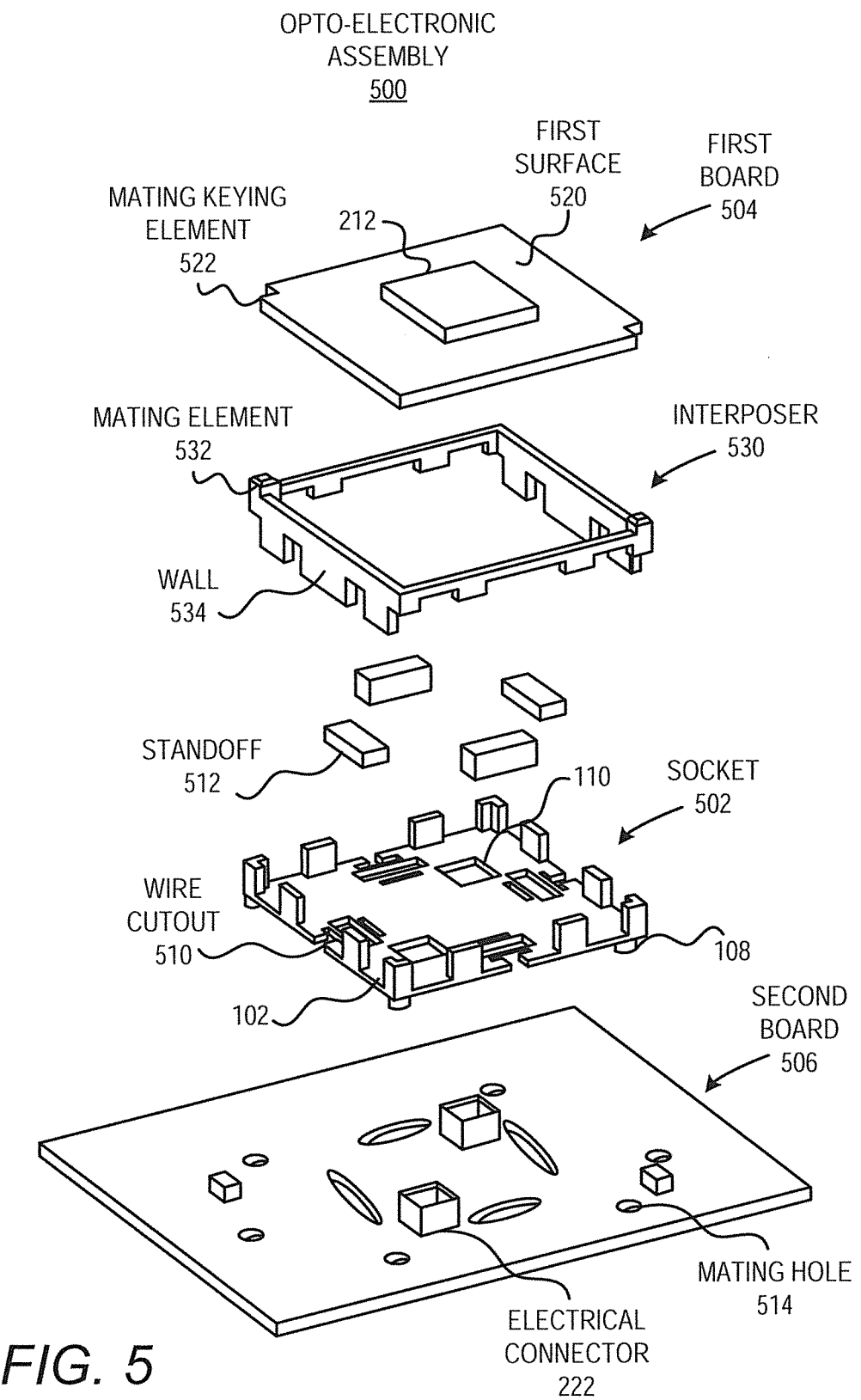
FIG. 5 shows an exploded view of an opto-electronic assembly containing a socket positioned between a first board and a second board, according to an example of the present disclosure.

Turning now to FIG. 5, there is shown an exploded view of an opto-electronic assembly 500 containing a socket 502 positioned between a first board 504 and a second board 506, according to an example of the present disclosure. As shown in FIG. 5, the socket 502 may include features in addition to those depicted in FIGS. 1-3. For instance, in addition to the features described above with respect to the sockets 100 and 300, the socket 502 may include additional openings and cutouts 510 for supporting optical connectors 224 or standoffs 512 for optical connectors 224 (FIG. 2). That is, the cutouts 510 may be shaped to allow optical fibers 226 (FIG. 2) from the optical connectors 224 to extend out of the socket 502 while minimizing blockage of airflow through the air ducts 106. In addition, the standoffs 512 may be positioned to support respective optical connectors 224 such that the optical connectors 224 correctly mate with optical transceivers 216 (FIG. 2) positioned on a bottom surface of the first board 504.

The second board 506 is depicted as including the electrical connectors 222 (FIG. 2) and mating holes 514 into which the socket alignment elements 108 on the socket 502 are to be inserted. The electrical connectors 222 are to be inserted into the connector openings 110 in the socket 502.

The first board 504 is depicted as including the processor chip 212 on a first surface 520 of the first board 504. Additionally, the first board 504 is depicted as including a mating keying element 522 that may mate with a keying element (not shown) on the socket 502 to enable the first board 504 to be blindly mated with the socket 504. In another example, however, the mating keying element 522 of the first board 504 may be mated with a mating element 532 of an interposer 530 as shown in FIG. 5.

The interposer 530 may be positioned between the socket 502 and the first board 504 to increase the height of the space between the first board 504 and the second board 506. The interposer 530 may be implemented for example when the electrical connector 222 has a height that is relatively higher than the height of the space. In other examples, the interposer 530 may be implemented to increase the volume of airflow through the space between the first board 504 and the second board 506. Electrical connector 222 may have an extension electrical connector (not shown) to properly mate to the mating electrical connector 214 (in FIG. 2) under the first board 504, as the distance between the first board 504 and the second board 506 is increased when an interposer 530 is added to the socket 502. In any regard, the interposer 530 may include a plurality of castellated walls 534, in which some of the portions of the walls 534 may be inserted into some of the air ducts 106 in the socket 502 such that the interposer 530 mates with the socket 502. Although not shown, rails may be provided in the walls 104 of the socket 502 and/or the walls 534 of the interposer 530 to facilitate mating between the socket 502 and the interposer 530. Although not shown, the interposer 530 may have shaped materials extending towards the inner cavity of the socket 502 to provide air baffles (or diverters) for air flow to be directed within the socket 502. Furthermore, in other examples also not shown, the shaped materials extending towards the inner cavity of the socket 502 may have a column similar to the column 302 (FIG. 3) to provide weight bearing structural support between the first board 504 and the base section 102.

Figure 6:
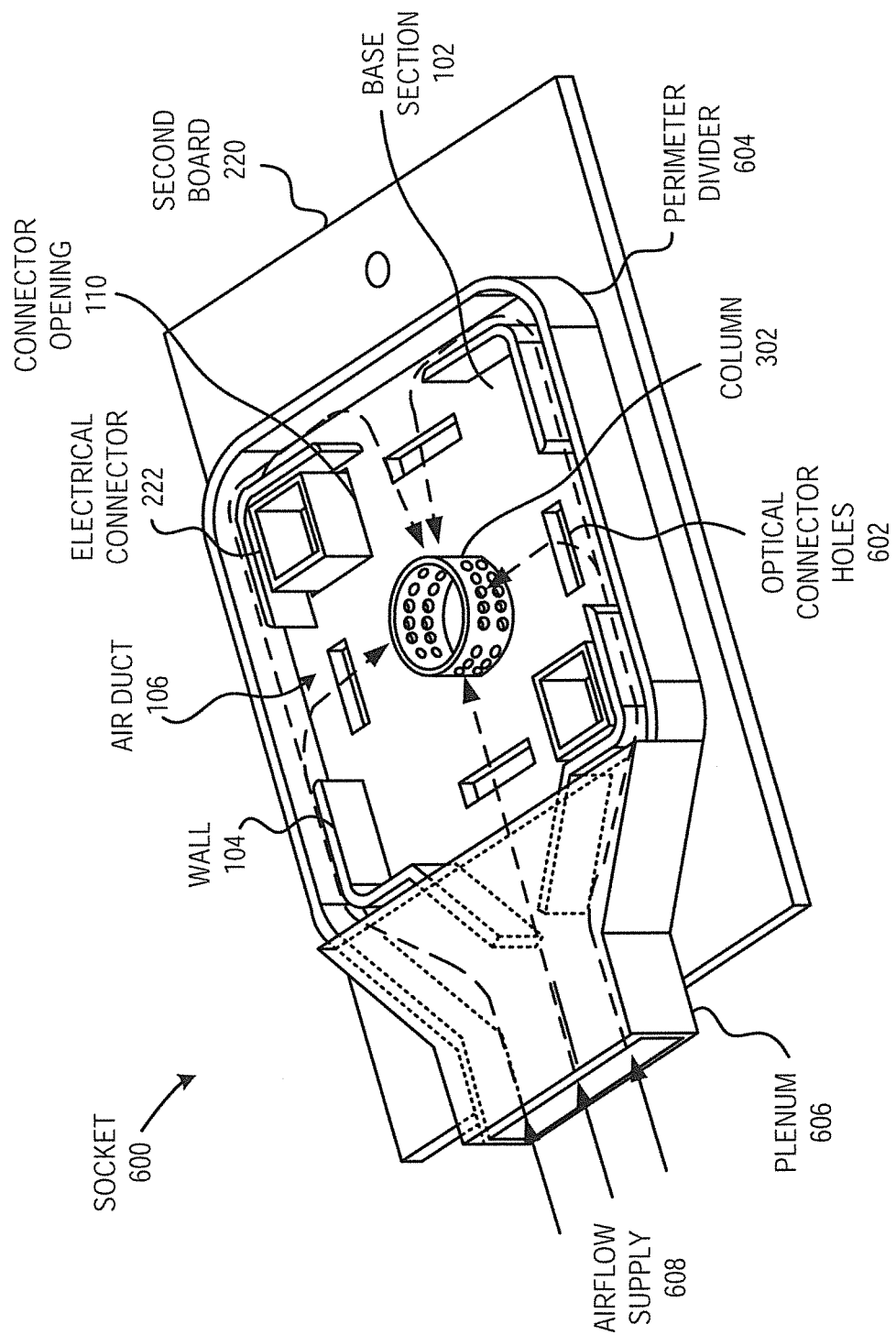
FIG. 6 shows an isometric view of a socket, partially in cross-section, to support a first board in spaced relation to a second board, according to another example of the present disclosure.

With reference now to FIG. 6, there is shown an isometric view of a socket 600, partially in cross-section, to support a first board in spaced relation to a second board, according to another example of the present disclosure. Although not explicitly shown in FIG. 6, a first board 210 may be positioned on top of the socket 600 in any of the manners discussed above.

As shown in FIG. 6, the socket 600 may include a base section 102 and a plurality of walls 104, in which a plurality of air ducts 106 may be provided in the walls 104. The socket 600 may also include connector openings 110 through which electrical connectors 222 from the second board 220 may extend. In addition, the socket 600 may include optical connector holes 602 to which optical connectors 224 may be connected and through which optical fibers 226 connected to the optical connectors 224 may extend.

The socket 600 is further depicted as including elements for controlling airflow through a ventilated column 302 as denoted by the dashed arrows. The socket 600 is depicted as including a perimeter divider 604, which may be positioned around a perimeter of the walls 104 to substantially limit or block airflow from exiting out through the sides of the socket 600. The socket 600 is also depicted as including a plenum 606 through which a supply of airflow 608 may be directed into the socket 600 from an airflow source (not shown), e.g., a blower, a fan, or the like. In the example depicted in FIG. 6, an opening may also be provided through the second board 220 in line with the central opening in the column 302 such that airflow supplied into the socket 600 from the airflow supply 608 may flow within the socket 600 and may be exhausted through the column 302 as indicated by the dashed arrows.

In a further example, the plenum 606 and airflow supply 608 may be provided directly into the air ducts 106 of the walls 104 of the sockets 100, 300, 502 depicted in FIGS. 1-5. In this regard, a plenum, such as the plenum 606, may be positioned to supply airflow through the air ducts 106 in any of the sockets 100, 300, 502, In yet further example, the direction of the airflow supply 608 may be reversed.

Figure 7:
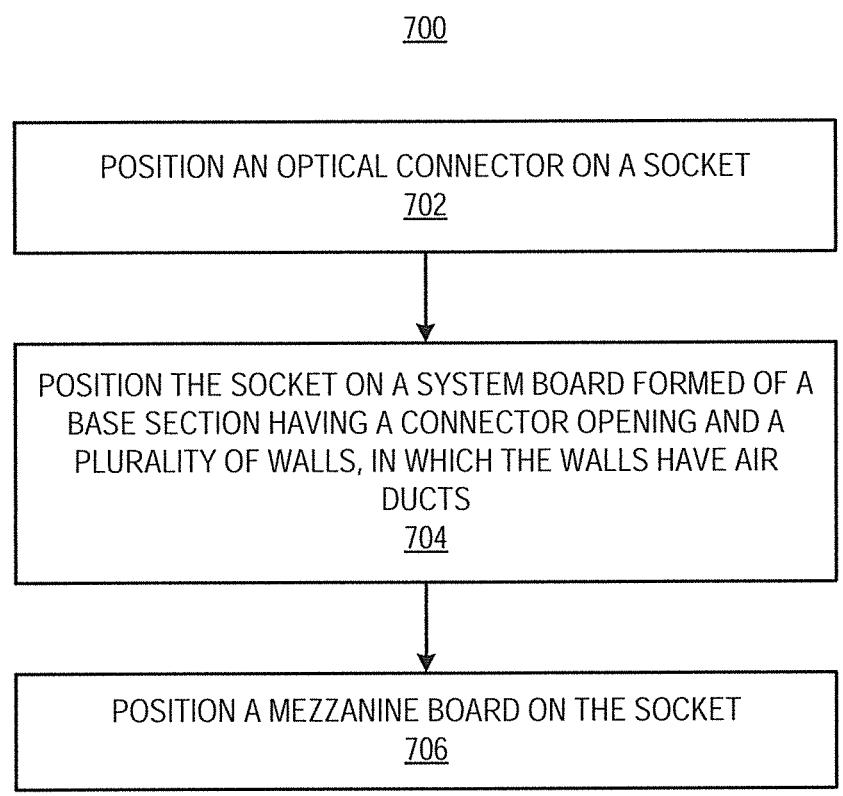
FIG. 7 is a flow diagram of a method of assembling an opto-electronic assembly, according to an example of the present disclosure.

With reference now to FIG. 7, there is shown a flow diagram of a method 700 of assembling an opto-electronic assembly 200, 500, according to an example. It should be apparent to those of ordinary skill in the art that the method 700 may represent generalized illustrations and that other operations may be added or existing operations may be removed, modified, or rearranged without departing from the scope of the method 700. For instance, the order in which the operations are described in the method 700 may be rearranged. In addition, although particular reference is made to various components depicted in FIGS. 1-6 in the description of the method 700, it should be understood that the method 700 may be implemented using other components without departing from a scope of the method 700.

At block 702, an optical connector 224 may be positioned on a socket 100, 300, 502, 600 formed of a base section 102 having a connector opening 110 and a plurality of walls 102 extending from the base section 102 that are angled with respect to the base section 102, and in which the plurality of wails 102 include air ducts 106 to enable air to flow through the socket. At block 704, the socket 100, 300, 502, 600 may be positioned on a system board 220, 506 having an electrical connector 222 such that the electrical connector 222 extends through the connector opening 110. In addition, at block 706, a mezzanine board 210, 504 on the socket 100, 300, 502, 600, wherein the mezzanine board 210, 504 has a top surface and a bottom surface, wherein a processor chip 212 is attached to the top surface and an optical transceiver 216 and a mating electrical connector 214 are attached to the bottom surface, and wherein positioning of the mezzanine board 210, 504 on the socket 100, 300, 502, 600 causes the electrical connector 222 on the system board 220, 506 to mate with the mating electrical connector 214 on the mezzanine board 210, 504 and causes the optical connector 224 to mate with the optical transceiver 216 on the mezzanine board 210, 504.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A socket to support a first board in a spaced relation to a second board, said socket comprising:
a base section having openings to receive connectors that are to electrically connect the first board to the second board;
a plurality of walls extending from the base section, wherein each of the plurality of walls is angled with respect to the base section and wherein the plurality of walls include air ducts to enable air to flow through the socket when the first board is positioned on the socket;
an interposer having castellated walls that are to mate with some of the air ducts in the plurality of walls of the socket, wherein the interposer is to be positioned between the socket and the first board; and
socket alignment elements extending from the base section, wherein the socket alignment elements are to be inserted into mating holes in the second board.

2. The socket according to claim 1, further comprising:
a plurality of fillers to be selectively inserted into the air ducts to control airflow properties through the socket.

3. The socket according to claim 1, further comprising:
a filler to be removably inserted into an air duct of the air ducts, said filler including a gap through which a cable is to be provided; and
an airflow diverting element positioned on the base section to divert airflow through the socket.

4. The socket according to claim 1, further comprising:
an optical connector alignment element extending from the base section, wherein an optical connector of an optical transceiver is to mate with the optical connector alignment element.

5. The socket according to claim 1, further comprising:
a cable management element positioned within an air duct.

6. The socket according to claim 1, further comprising:
a column extending from the base section, wherein the column is to contact a section of the first board.

7. The socket according to claim 6, further comprising:
a thermal rod positioned in the column to conduct heat from the first board; and
a thermally insulating material positioned around the column to reduce heat flow from the column into an interior of the socket.

8. The socket according to claim 6, wherein an application specific integrated circuit (ASIC) is positioned on a top side of the first board, wherein the column is positioned to contact a bottom side of the first board directly underneath the ASIC, and wherein the column has a hollow core surrounded by a perforated wall to enable air to flow through the perforated wall and through the hollow core.

9. The socket according to claim 1, further comprising:
a perimeter divider extending in an angled manner from the base section outside of the plurality of walls, said perimeter divider having a plenum through which air is to flow.

10. The socket according to claim 1, further comprising:
an electrical connector extending from the base section through an opening to receive the connectors, wherein each of the electrical connectors has a hollow core and a perforated wall to enable air to flow through the perforated wall and through the hollow core.

11. An opto-electronic assembly comprising:
a first board having top surface and a bottom surface, wherein a processor chip is attached to the top surface and an optical transceiver is attached to the bottom surface;
a second board having an electrical connector, wherein the electrical connector has a hollow core and a perforated wall to enable air to flow through the perforated wall and through the hollow core;
a socket positioned between the first board and the second board, wherein the socket includes:
a base section having a connector opening through which the electrical connector extends;
a plurality of walls extending from the base section, wherein each of the plurality of walls is angled with respect to the base section and wherein the plurality of walls include air ducts to enable air to flow through the socket; and an optical connector positioned in the socket, wherein the optical connector is connected to the optical transceiver.

12. The opto-electronic assembly according to claim 11, wherein the first board includes a mating electrical connector attached to the bottom surface, wherein the electrical connector on the second board is connected to the mating electrical connector.

13. The opto-electronic assembly according to claim 11, further comprising:
an interposer having castellated walls that are in mating relationship with some of the air ducts in the plurality of walls of the socket, wherein the interposer is positioned between the socket and the first board.

14. A method of assembling an opto-electronic assembly, said method comprising:
positioning an optical connector on a socket formed of a base section having a connector opening and a plurality of walls extending from the base section that are angled with respect to the base section, wherein the plurality of walls include air ducts to enable air to flow through the socket, and wherein the plurality of walls are surrounded by a perimeter divider having a plenum through which air is to flow, the perimeter divider extending in an angled manner from the base section;
positioning the socket on a system board having an electrical connector such that the electrical connector extends through the connector opening; and
positioning a mezzanine board on the socket, wherein the mezzanine board has a top surface and a bottom surface, wherein a processor chip is attached to the top surface and an optical transceiver and a mating electrical connector are attached to the bottom surface, and wherein positioning of the mezzanine board on the socket causes the electrical connector on the system board to mate with the mating electrical connector on the mezzanine board and causes the optical connector to mate with the optical transceiver on the mezzanine board.

15. The method of claim 14, further comprising mating an interposer having castellated walls with some of the air ducts in the plurality of walls extending from the base section.

16. The method of claim 14, further comprising selectively inserting a plurality of fillers into the air ducts to control airflow properties through the socket.

17. A socket to support a first board in a spaced relation to a second board, said socket comprising:
a base section having openings to receive connectors that are to electrically connect the first board to the second board;
a plurality of walls extending from the base section, wherein each of the plurality of walls is angled with respect to the base section and wherein the plurality of walls include air ducts to enable air to flow through the socket when the first board is positioned on the socket;
a column extending from the base section, wherein the column is to contact a section of the first board;
wherein an application specific integrated circuit (ASIC) is positioned on a top side of the first board, wherein the column is positioned to contact a bottom side of the first board directly underneath the ASIC, and wherein the column has a hollow core surrounded by a perforated wall to enable air to flow through the perforated wall and through the hollow core; and
socket alignment elements extending from the base section, wherein the socket alignment elements are to be inserted into mating holes in the second board.

18. The socket according to claim 17, further comprising:
a perimeter divider extending in an angled manner from the base section outside of the plurality of walls, said perimeter divider having a plenum through which air is to flow.

19. The socket according to claim 17, further comprising:
an electrical connector extending from the base section through an opening to receive the connectors, wherein each of the electrical connectors has a hollow core and a perforated wall to enable air to flow through the perforated wall and through the hollow core.

20. The socket according to claim 17, further comprising:
a thermal rod positioned in the column to conduct heat from the first board; and
a thermally insulating material positioned around the column to reduce heat flow from the column into an interior of the socket.

* * * * *